United States Patent [19]

Silver et al.

[11] Patent Number: 4,799,545

[45] Date of Patent: Jan. 24, 1989

[54] BACTERIA AND ITS USE IN A MICROBIAL PROFILE MODIFICATION PROCESS

[75] Inventors: Richard S. Silver, Allentown; Pamela M. Bunting, Cheswick, both of Pa.; William G. Moon, Newton, N.J.; Willard P. Acheson, Pittsburgh, Pa.

[73] Assignee: Chevron Research Company, San Francisco, Calif.

[21] Appl. No.: 140,892

[22] Filed: Dec. 29, 1987

Related U.S. Application Data

[63] Continuation of Ser. No. 22,857, Mar. 6, 1987, abandoned.

[51] Int. Cl.$^4$ ............... E21B 33/138; E21B 43/22
[52] U.S. Cl. ................................ 166/246; 166/294; 435/242
[58] Field of Search ............. 166/246, 270, 294, 300; 435/222, 242, 253, 836

[56] References Cited

U.S. PATENT DOCUMENTS

| | | |
|---|---|---|
| 3,532,166 | 10/1970 | Williams .............................. 166/274 |
| 4,165,257 | 8/1979 | Stokke ............................ 166/246 X |
| 4,460,043 | 7/1984 | Thompson et al. ................... 166/246 |
| 4,475,590 | 10/1984 | Brown .................................. 166/246 |
| 4,522,261 | 6/1985 | McInerney et al. .................. 166/246 |
| 4,558,739 | 12/1985 | McInerney et al. .................. 166/246 |
| 4,658,898 | 4/1987 | Paul et al. ....................... 166/246 X |

OTHER PUBLICATIONS

Thomas R. Jack et al., "Selective Plugging for Heavy Oil Recovery", Microbes and Oil Recovery (vol. 1) International Bioresources Journal, pp. 205–212.
Eric C. Donaldson et al., "There are Bugs in my Oil Well", Chemtech, Oct. 1985, pp. 602–604.
P. J. Kalish et al., "The Effect of Bacteria on Sandstone Permeability", Journal of Petroleum Technology, Jul. 1964, pp. 805–814.
R. A. Raiders et al., "The Use of Microorganism to Increase the Recovery of Oil from Cores", Society of Petroleum Engineers of AIME, 1985, SPE 14336, pp. 1–8.
Teh Fu Yen, "Bacteria Transport Through Porous Media", Contract No. De-AS19-81BC10508, University of Southern California, 1982/1984, pp. 131–142.
D. E. Revus, "A Study of Reservoir Selective Plugging Utilizing in Situ Growth of Bacteria to Improve Volumetric Sweep Efficiency", (Thesis), 1982, pp. i–ix/1–110.

R. Knapp, "The Use of Microorganisms in Enhanced Oil Recovery", Second Annual Report, Oct. 1, 1982–Dec. 31, 1984, DOE/DC/10300-34 (Nov. 1985).
D. Hitzman, "Petroleum Microbiology and the History of its Role in Enhanced Oil Recovery", Proc. Int'l. Conf. on Micro. Enh. Oil Rec., p. 162 (May 16–21, 1982).
L. K. Jang et al., "An Investigation of the Transport of Bacteria Through Porous Media", 1982 Proceedings, p. 60.
G. E. Jenneman et al., "Transport Phenomena and Plugging in Berea Sandstone Using Microorganisms", 1982 Proceedings, p. 71.
D. M. Updegraff, "Plugging and Penetration of Petroleum Reservoir Rock by Microorganisms", 1982 Proceedings, p. 80.
C. Brierley et al., "Investigation of Microbial Induced Permeability Loss During In Situ Leaching", Bureau of Mines (NTIS Publication) Apr. 1982.
L. Allison, "Effect of Microorganism on Permeability of Soil Under Prolonged Submergence", vol. 63, Soil Science, pp. 439–450 (1947).
M. Singer, "Microbial Biosurfactants, Reproduced from Microbes and Oil Recovery", (vol. 1) Int'l Biores. Jour., edited by Zajic et al., (1985).
R. Hart et al., "The Plugging Effect of Bacteria in Sandstone Systems", Can. Mining and Metall. Bull., Jul. 1960.
D. Updegraff, "The Effect of Microorganisms on the Permeability and Porosity of Petroleum Reservoir Rock", Chap. 6 from Zajic et al., Microbial Enh. Oil Rec., Penn. Well Books (1983).

Primary Examiner—George A. Suchfield
Attorney, Agent, or Firm—S. R. La Paglia; W. K. Turner; P. L. McGarrigle, Jr.

[57] ABSTRACT

The present invention is a bacteria and its use in a Microbial Enhanced Oil Recovery (MEOR) process. Any one of two newly isolated strains of bacteria are injected downhole in a petroleum reservoir to modify its profile. This bacteria has the capability to plug the zones of higher permeability within the reservoir so that a subsequent waterflood may selectively enter the oil bearing less permeable zones. The injected water is used to drive this oil to an area where it may then be recovered.

28 Claims, 2 Drawing Sheets

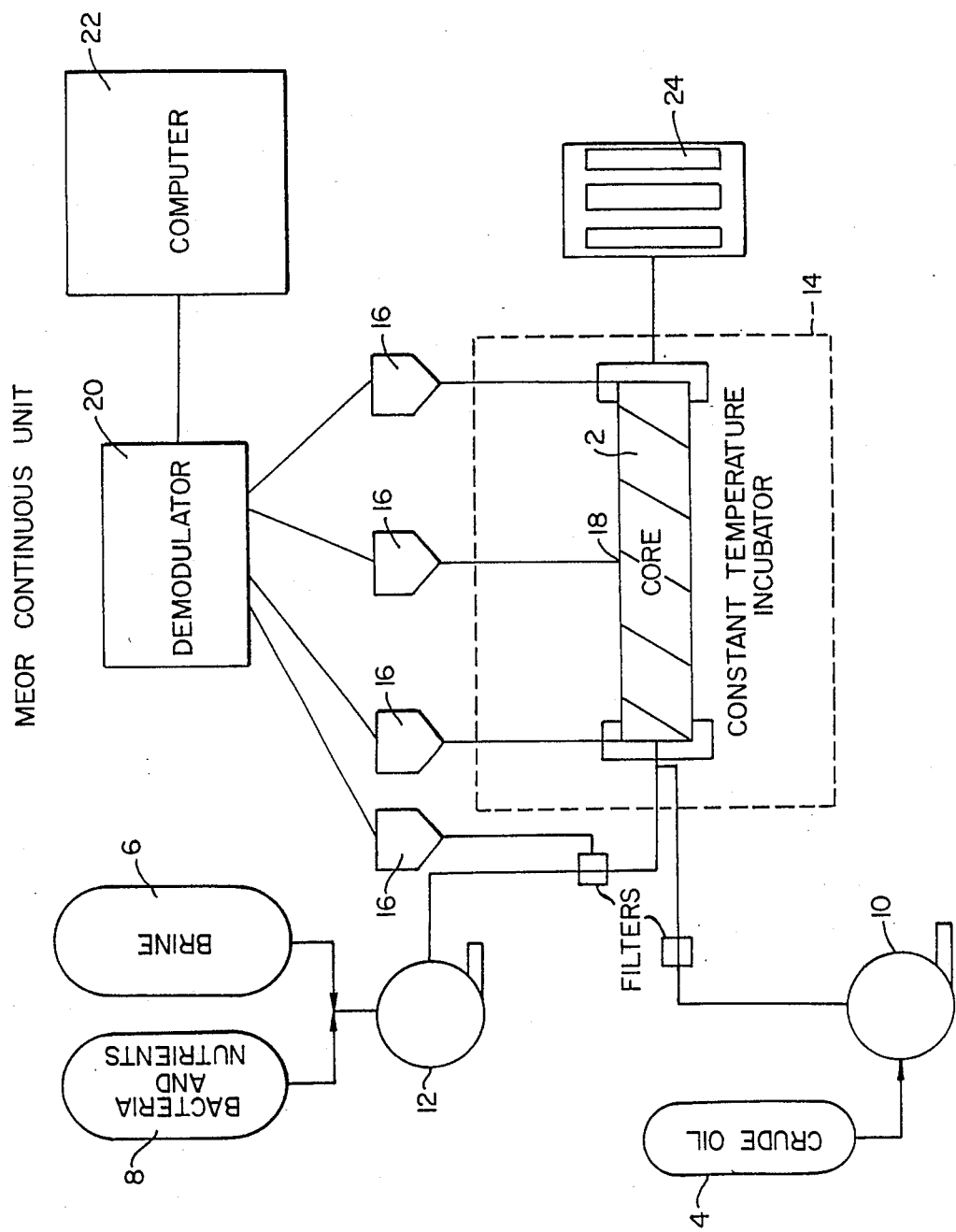
FIG._1.

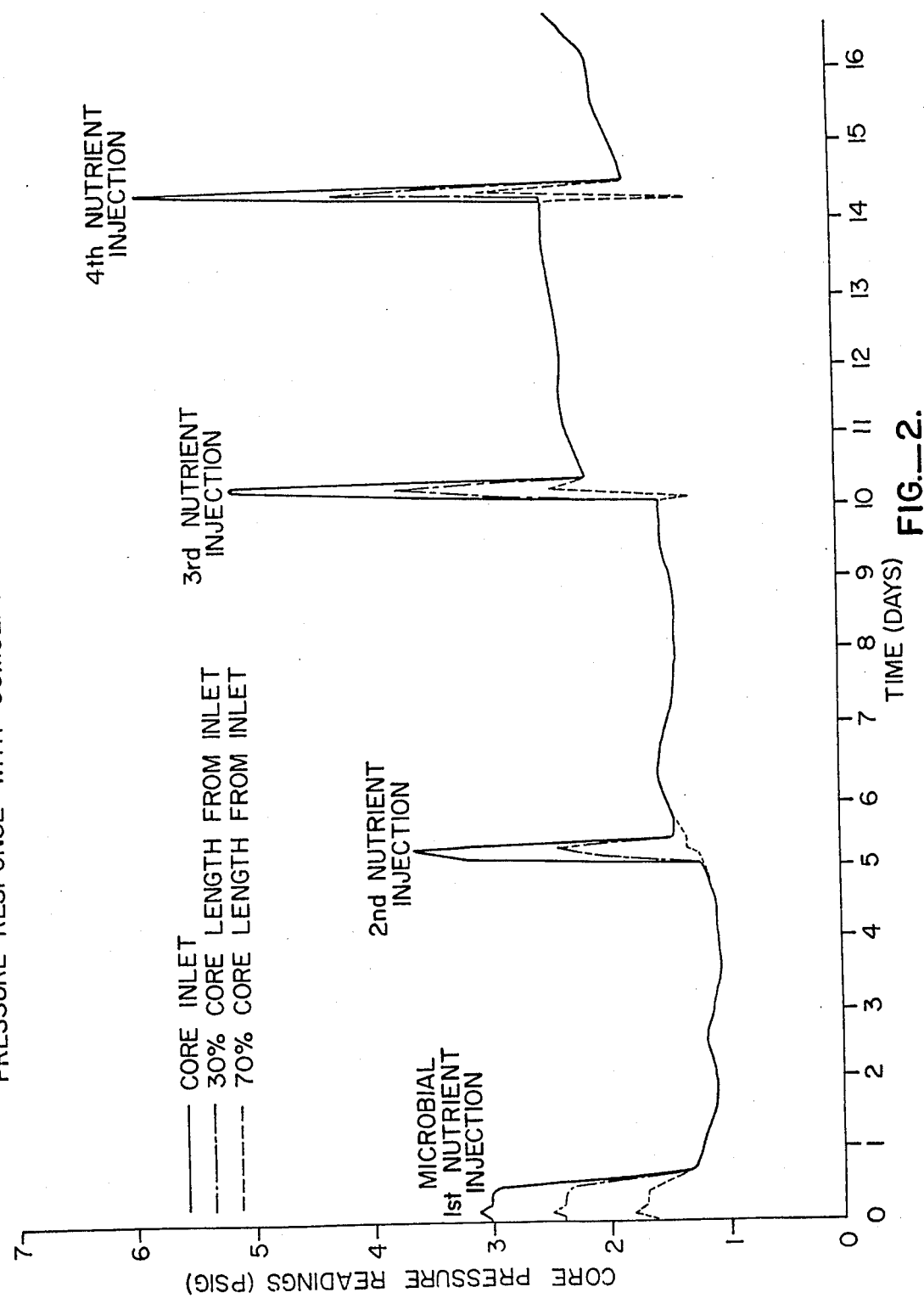

BACTERIA AND ITS USE IN A MICROBIAL PROFILE MODIFICATION PROCESS

This application is a continuation of application Ser. No. 22,857 filed Mar. 6, 1987, now abandoned.

BACKGROUND OF THE INVENTION

This invention generally relates to the use of microorganisms to enhance oil recovery from petroleum reservoirs. Here, a specific strain of bacteria is used to plug high permeability zones and increase waterflood efficiency by redirecting the flood to lower permeabiltiy, oil-bearing zones.

Petroleum that is in underground reservoirs is brought to the surface in a variety of ways. One of the more notable publicly held ideas of oil recovery is the "gusher," however, due to the changing nature of oil reserves, and economic and environmental policies, the gusher is the thing of the past. Surface pumps, which are a common highway sight, oftentimes provide the lift force necessary to bring oil to the surface in those reservoirs where the reservoir pressure is insufficient. Additionally, subsurface pumps can be coupled with the surface pumps to assist in the lifting duty. However, there comes a time in the life of many reservoir formations in which the reservoir pressure and the pumping devices are not enough to overcome the oil viscosity and the capillary forces of the formation. At this point, enhanced oil recovery (EOR) techniques are useful to recover additional oil that refuses to come to the surface by the means described above.

The term "EOR" spans a panoply of techniques and devices that are used to recover the last bit of oil reserves. There are devices and methods for: steam injection, water injection, gas drive, emulsification, injecting plugging agents, etc. One "device" that may perform many of these feats is a microorganism, most notably, a bacteria.

The idea of using bacteria to increase or enhance oil recovery is not new. Many laboratory investigations and a number of field tests have been performed both in the U.S. and elsewhere [see generally, J. Davis, Petroleum Microbiology (1967) and works collected in J. E. Zajic et al., Microbes and Oil Recovery, Bioresource Publications, El Paso (1985)]. Several technical meetings devoted exclusively to microbial enhanced oil recovery (MEOR) have been held. Some of the previous literature consists of anecdotal accounts or inadequately controlled studies, resulting in a skeptical appraisal of the technology. [See also D. Hitzman, Petroleum Microbiology and the History of its Role in Enhanced Oil Recovery, Proc. Int'l. Conf. on Micro. Enh. Oil Rec., p 162, (May 16–21, 1982), and E. Donaldson et al., There are Bugs in My Oil Well, Chemtech, p 602 (October 1985).]

The principle behind MEOR is based on the fact that microbes can produce most of the agents now employed in chemical EOR; i.e., water-soluble polymers, surfactants, co-surfactants and solvents such as ethanol and acetone, and acids. (See M. Singer, Microbial Biosurfactants in Zajic, Microbes and Oil Recover, U.S. Pat. No. 4,522,261 to McInerney et al., U.S. Pat. No. 2,807,570 to Updegraff and U.S. Pat. No. 2,660,550 to Updegraff et al.) Some microbial-produced products, e.g., xanthan biopolymer, are now commercially used for EOR. Such use is dependent on the cost-effectiveness of the microbial product compared to competing non-microbial products, e.g., xanthan as compared to polyacrylamide. In this application, the definition of MEOR applies to processes involving the in-situ application of microbial processes and usually excludes EOR processes which merely involve the use of chemical products which are produced in a fermentation plant.

The specific application of microorganisms for EOR in this invention is their use for the selective plugging of zones of high permeability (i.e., thief zones) in petroleum reservoirs. To back up a bit, when water injection is used to recover oil, it is injected downhole in an injection well to move any oil out of the formation to be recovered at a producing well. The water pushes the oil out of the small interstices and pores of the rocks, but it pushes the oil out of the wider spaces and larger pores (i.e., zones of higher permeability) first, leaving the smaller areas still filled with oil. Since petroleum is formed in stratified sedimentary deposits, several distinct layers of oil-bearing sands are usually present over the vertical profile of an oil well. Different layers can vary widely in permeability and porosity, as well as other propeties. Since a waterflood will naturally seek the zone of least resistance (or highest permeability) low permeability zones may be bypassed. After a time, recoverable oil is "watered out" of the high permeability zones, but the low permeability streaks still contain considerable recoverable oil. "Profile modification" provides a way that the residual oil may be recovered from these lower permeability zones. Current technology involves the injection of water-soluble polymers, which selectively enter the high permeability zones. Cationic cross-linking agents, i.e., $Cr^{+3}$, $Ti^{+4}$, or $Al^{+3}$, held in solution by a complexing agent (i.e., citrate) or by oxidation state, are co-injected with the polymer or are swept after the polymer. (See U.S. Pat. No. 4,552,217 to Wu et al.) As the polymer gradually cross-links and gels into a water-insoluble 3-D matrix in the high permeability zones, the waterflood is channeled into zones of lower permeability, thus increasing oil production. There are problems associated with the techniques of profile modification with cross-linking polymers. Such polymers are relatively expensive, they may shear-degrade upon injection at the wellhead and may not penetrate sufficiently before gelling. For this reason, the use of microorganisms may prove promising in profile modification because it may eliminate some of these problems.

As with other techniques, using microbes to plug high permeability zones is not exactly new. Some early researchers are listed in J. Davis, "Petroleum Microbiology" (1967) and more recently there is U.S. Pat. No. 4,558,739 to McInerney et al.; and D. Revus, A Study of Reservoir Selective Plugging Utilizing In Situ Growth of Bacteria to Improve Volumetric Sweep Efficiency, Masters Thesis, Univ. of Oklahoma (1982), P. Kalish et al., The Effect of Bacteria on Sandstone Permeability, 16 Jour. Pet. Tech. 805 (July 1964). C. Brierly et al., Investigation of Microbially Induced Permeability Loss During In-Situ Leaching, Bureau of Mines (NTIS Publication) (April 1982). They use microbes in a variety of ways to enhance oil recovery. Some researchers have used the bacteria that naturally exists in the formation and have simply injected nutrients downhole to stimulate their growth and plug the formation [see U.S. Pat. No. 4,475,590 to Brown and L. Allison, Effect of Microorganisms on Permeability of Soil Under Prolonged Submergence, 63 Soil Science 439 (1947)]. Others have injected bacteria downhole followed by a nutrient solution. Some researchers depend on the biomass of the bacteria for plugging purposes, while others show that exopolymers produced by the bacteria are effective in closing off areas of high permeability.

Another factor in this plugging technique is the size of the organism being injected. Smaller bacteria may penetrate the formation a bit easier than larger bacteria. To that end, the spores of different bacteria may be used for injection to penetrate even deeper. Spores penetrate a reservoir formation easier and become lodged in these permeable zones, so that when they are stimulated to grow by a nutrient solution, they will plug more pores more effectively.

Other problems exist with the nutrient solutions used in the prior art. For example, downhole in a petroleum reservoir, there are conditions that put further constraints on microorganisms. More specifically, connate water, in many formations, has both high concentrations of salt (NaCl), alkaline earth ions ($Ca^{+2}$, $Mg^{+2}$, $Ba^{+2}$), and heavy metal ions. Such ions can form insoluble precipitates with many of the standard components of bacterial nutrient media. These precipitates can plug the wellbore and prevent injection of cells or nutrients. Furthermore, some of these ions are inhibitory or toxic or microbial cells and some (e.g., $Ca^{+2}$) are inhibitory to production of microbial biopolymer. Bacteria and the nutrient source that are injected downhole must be tolerant to these if they are to survive.

The downhole environment is usually anoxic, unlike the highly oxygenated condition above. To be able to survive and live in both environments, a bacteria must either be shielded from oxygen (which may be difficult and expensive) or must be tolerant to it (e.g., a facultative anaerobe). [Bacteria can be broadly divided into 3 categories based on their ability to utilize and tolerate oxygen: (1) obligately aerobic bacteria, which require molecular oxygen for growth; (2) obligately aneaerobic bacteria, to which molecular oxygen is toxic; and (3) facultative anaerobes, which can grow either in the presence or absence of atmospheric oxygen. Of the three, facultative anaerobes appear to be the most suitable MEOR candidates, since they can survive exposure of air during storage and injection while retaining the ability to grow well anaerobically.]

The most important ingredient, i.e., the bacteria, sometimes must be selected for these exact conditions that exist in a reservoir. Also, the nutrient's solution has to be tailored to both the bacteria and the reservoir in which it will be injected. All these considerations must be merged together to provide the desired result in plugging the formation thief zones.

OBJECTS OF THE INVENTION

It is an object of this invention to inject a bacterium, in the spore form, into a petroleum reservoir to selectively plug highly permeable thief zones, so that enhanced oil recovery techniques, such as water injection, and other enhanced oil recovery methods will be more effective. It is a further object of this invention to develop novel techniques for spore preparation and injection that do not cause well-face plugging.

SUMMARY OF THE INVENTION

Mature petroleum reservoirs are frequently waterflooded to increase oil production. When a heterogeneous permeability profile exists, the flood poorly sweeps the less permeable zones. "Profile modification" is the enhancement of waterflood efficiency, generally accomplished by the injection of soluble, cross-linkable polymers and a cross-linking agent. The injected polymer selectively enters a highly permeable, watered-out "thief zones" where it sets into an insoluble cross-linked gel, thus channeling the waterflood into the tighter, oil-bearing zones.

The present microbial process should improve sweep efficiency more effectively than is currently possible with injected polymer, and at a significantly lower cost. We have isolated strains of bacteria from saline sediments which are halotolerant (able to live in a moderately salty environment), spore forming, thermotolerant (able to live within a wide temperature range), biopolymer-producing facultative anaerobes; that is, they can grow and produce a viscous biopolymer within a petroleum reservoir. When spores of these bacteria, pretreated in accordance with our techniques, are injected along with the specially designed nutrient solution of this disclosure, they selectively penetrate higher permeability zones. After germination and growth, their biomass, and the exopolymer (the polymer that is secreted outside of the cell) that is produced in-situ, gives the desired profile modification. The effectiveness is superior to injected polymers since the non-viscous spore suspension penetrates further, and the chemicals cost one-tenth that of polymers. Since the polymer is formed in-situ, there is no degradation from injection shear or storage. The novel techniques we have developed for spore preparation, injection, medium and cross-linker formulation and cross-linker delivery overcome problems of injectability, precipitation and control prevalent in the prior art and render the technique operable and practical.

It is also within the scope of this invention to reduce the permeability of underground formations to restrict the spread of contaminant materials. For example, to prevent the flow of hazardous wastes into underground aquifiers.

BRIEF DESCRIPTION OF THE DRAWINGS

FIG. 1 is an example of a MEOR continuous testing unit.

FIG. 2 shows the pressure response of cummulative nutrient addition on growing cells in a core.

DETAILED DESCRIPTION OF THE INVENTION

MEOR requires the use of halotolerant, facultative anaerobes since most oil field connate waters are salty and oxygen tension is nil. The cells must be thermophilic (able to grow above 55° C.) or "thermotolerant" (able to grow over a wide temperature range including 40°–50° C. and survive exposure to above 55° C.) since petroleum reservoirs are most frequently within this temperature range. The cells (or spores from the cells) must be small-sized and mobile (or motile) so they can penetrate far into the porous rock. They must have non-fastidious nutrient requirements since laboratory culture media would be prohibitively expensive for field application where huge volumes are injected. The cells must be able to grow and produce the desired product under in-situ conditions of pH, temperature, heavy metal ion concentration, etc. Although some oil-bearing formations are too hot, impermeable or otherwise inhospitable to microbial presence, many are within a temperature range of 20°–80° C. and can support microbial presence and growth. Microbes used for MEOR must also be non-pathogenic and must not produce any animal or plant toxins, since they may be injected near water supply aquifiers.

Although many microbes can utilize hydrocarbons as the sole carbon and energy source, all known species that do this are aerobes which require molecular oxygen for the initial attack on hydrocarbons. If facultative anaerobes are used for MEOR, non-petroleum carbon sources should be supplied. Unless hydrocarbon-utilizing anaerobes can be created through recombinant DNA techniques, sufficient non-hydrocarbon metabolizable components must be present in the petroleum. Suitable carbon substrates are cheap carbohydrates such as molasses and whey and possibly inexpensive synthetic substrates such as methanol. Nitrogen, phosphorous and other nutrients must also be supplied if these are not present in the carbon substrate or in the rock. Nutrients must be supplied at the correct time that microbial activity is desired; loss or absorption of nutrients would be an economic debit.

Facultative anaerobic halophilic, or halotolerant, thermotolerant bacteria may be used to achieve profile modification through the production of exopolymer and/or the growth of cells within highly permeable rock, thereby decreasing the permeability of this rock. The exopolymer forms an insoluble matrix within the rock pores which is resistant to bio-, shear, and thermal degradation. Ionic or other cross-linking agents are preferably used to enhance polymer stability in-situ. However, since the polymer is produced in-situ and not injected from the surface (where water solubility is essential), such cross-linking agents are an optional feature of our invention.

The spores which are injected are small enough to penetrate high permeability zones, but not the oil-bearing low permeability zones. The spores are prepared by growing cells on a sporulation medium to give a spore concentrate ($10^9$ spores/ml). This spore suspension is stable for long periods of time and is pretreated (by aging, lysozyme or other enzyme treatment) and filtered to remove cellular debris and improve injectability. The spore suspension may be diluted 1:1000 with nutrient or brine prior to injection, i.e., the injected spore concentration is approximately $10^6$/ml.

The Bacteria

The bacteria of choice have been described in U.S. application Ser. No. 23,070 which is herein incorporated by reference. They are two strains of *Bacillus licheniformis* (dubbed SLS-1 NRRL No 18179 and Salton-1, NRRL No. 18178 ) and possess the following characteristics: motility; facultative anaerobiasis; exopolymer production; sporulation, thermotolerance, and halotolerance. They will alter the profile of a petroleum reservoir by their own mass and their exopolymer when they are lodged in zones of high permeability. Since they are motile the bacteria may reach further into the permeable zone.

The biopolymer may be produced in larger quantities if one or a mixture of the following ingredients is added directly to the culture medium: phosphate in the form tri-polyphosphate, citric acid, $Al^{+3}$ (as aluminum citrate), or ammonium nitrate. Polyphosphate is an essential component of the preferred medium, in a salt form such as sodium, potassium or ammonium tri-polyphosphate.

BENCH-SCALE CONTINUOUS CORE TESTS

Automated Core Test Apparatus

An automated bench-scale laboratory unit was operated continuously for performing core 2 and packed column testing to demonstrate the feasibility of this MEOR approach. A simplified flow schematic of the unit is shown in FIG. 1. Six core experiments can be run simultaneously and independently. Oil 4 and brine 6, bacteria and nutrients 8 were fed through separate feed pumping systems (oil was pumped through pump 10 and brine, bacteria, and nutrients through pump 12). Sterile brine 6, bacterial cells (or spores) and nutrients 8 were pumped through 0.125" OD tubing using a Milton Roy or a peristaltic pump 12. To maintain anaerobic conditions, a small purge of nitrogen was bed into each vesel 6 and 8. Feed rates, depending on predetermined experimental conditions normally ranged from 0.03–1.0 ml/min. This has a field correlation feed rate of 0.3–11 linear ft/day. For temperature control, all cores 2 were placed in a constant temperature incubator 14. All experiments were conducted at 40° C. (104° F.). Differential pressure was recorded using tranducers 16 with appropriate diaphragms. In most experiments, pressure taps 18 were located at intervals along the length of the core 2. This was accomplished by drilling a 0.125" OD hole into and through the resin and epoxy (on the surface of the core 2) and into the sandstone of the core 12 such that fluid transmitted through the core 2 flowed out the hole. The holes in the resin were tapped and threaded and fitted with gyrolock connectors. Nylon tubing was connected from these fittings to a pressure transducer. Pressure signals were processed and converted to a digital signal by a signal demodulator 20. Calibration of the transducers 16 were performed using a preset nitrogen calibration pressure setup. A computer 22 continuously monitored (and every 30 minutes printed and logged to hard copy or floppy disk) the cores' pressure and other readings. The printout gave a time-pressure log so as to follow the pressure differential for the entire length of each core 2. This enabled an accurate compilation of pressure measurements for the entire duration of each core experiment independently. Flow rates were measured both from time-pump feed rates and from effluent product collection rates; these rates were continuously taken. The effluent samples were collected and continuously using a fraction collector 24.

CORE PREPARATION

Berea sandstone cores, obtained from Cleveland Quarries (Amherst, Ohio) were of 2" diameter and received as cylinders of specified lengths and permeabilities. A specified core is coated with epoxy and cast in a resin mold. After cutting the core to a designated length and facing the ends, it was placed in a core holder to be attached to the continuous flow apparatus and then vacuum saturated with brine for an accurate pore volume determination. An oil-brine saturated core was prepared by pumping several pore volumes of brine followed by adding several pore volumes of crude oil to a irreducible water saturation. Brine was then pumped through the core until no more oil was observed in the effluent. At this time, initial brine permeability was determined. For most experimental runs, the flow tubing, fittings, and valvings were disinfected and then completely flushed with sterile brine before each startup. Calculations for % porosity and % pore volume of oil saturation were also determined before starting each core experiment.

INJECTION OF CELLS AND NUTRIENT

Depending on the purpose of a designated experimental run, a core may or may not be oil saturated. The sequence of additions for an experiment are as follows:
1. Brine injection to determine permeability.
2. Add 0.3-1.0 pore volumes of cell or spore suspension at a concentration of approximately $10^6$ cells/ml.
3. Add 0.3-1.0 pore volumes of specifically formulated nutrient solution; thous could be added with the cells (as has been demonstrated).
4. A cross-linker ($Al^{+3}$ or $Cr^{+3}$) could also be added either with a waterflush or in combination with cells and/or nutrient material. The concentration of cross-linker would be about 1000 ppm. Such cross-linker is preferably held in solubilized form by polyphosphate salt.
5. Incubation ("lock in") for 5-10 days.
6. Commence brine addition or add a second nutrient and/or cross-linker batch. At this time a check is also made for permeability reduction and effluent samples are analyzed for biopolymer concentration.
7. Incubation (repeated).
8. Steps 6 and 7 can be repeated.
9. Final brine addition to check for lasting permeability reduction.

MONITORING PERFORMANCE DURING CORE RUNS

Cell growth along with biopolymer production for the enhancement of lasting permeability reduction is the ultimate goal of our MEOR process. Monitoring the extent of this growth and production during an ongoing core experiment can be accurately accomplished by recording gas pressure buildup as cells grow, calculating and evaluating pressure gradients and overall permeability calcuations (while pumping) during sequential additions, and by performing analyses on effluent samples taken; i.e., cell plate count, biopolymer concentration, and residual sucrose (the most frequently used carbon source) concentration, etc. Several demonstration experiments were completed using this basic apparatus.

EXAMPLE 1 (Nutrient Utilization)

FIG. 2 shows the pressure response of cumulative nutrient addition on growing cells in the core. Previously added cells (to the core) were fed 4 separate batches of nutrient with approximately five days' incubations between each addition. Separate curves are shown for the pressure response at: (1) at core's inlet, (2) 30;1 % length from the inlet, and, (3) 70% length from the inlet. As shown, pressure response increases as a function of time as a result of step-wise nutrient addition to the core's previously added cells. The increase in static pressure during incubation is due to cell gas production ($CO_2$) while the increase in dynamic (pumping) pressure with each injection is due to the accumulation of cell mass/biopolymer throughout the length of the core. It has been repeatedly demonstrated that when core effluent cell count and nutrient sucrose utilization increase, a desired reduction in core permeability results (as is shown here; i.e., 367 millidarcy or md to 58 md).

EXAMPLE 2 (Long Distance Transport)

To verify the present of in situ produced biopolymer at extended distances from the injection site, a 40 ft. packed Berea "slim tube" (crushed sandstone) was constructed with pressure transducers and sampling ports at 10 intervals. The initial brine permeability of the slim tube (76 cc pore volume) was 6.7 d (6700 md) and after feeding 2.3 pore volumes (abbreviated PV) of $6 \times 10^7$ cells/ml at a rate of 0.11 ml/min (80 ft/day) for 17 hours, the sample port at the end (40 ft. length) of the tube showed $10^4$ cells/ml of cells identical to those fed and 113 ppm biopolymer that these cells produced. As time and subsequent additions proceeded, the overall permeability was reduced to 0.4 d (400 md), and the biopolymer concentration at the end of the slim tube in the effluent was measured at 1222 ppm.

This experiment enabled measurements of polymer production-pentration and adsorption over a long distance corresponding to a "thief zone" in the field. The results show that the cells and subsequently produced biopolymer completely penetrated to the end of the tube, demonstrating the effectiveness of the MEOR technique. Total "plugging" of the slim tube is further evidenced by the following points:
1. Throughout the course of the experiment, the feed pump rate had to be reduced. The progressively slower rate was needed to stay below the pressure limitations on the equipment. The pressure buildup and slower feed rate demonstrates the effectiveness of biopolymer buildup in the total length of the slim tube.
2. Permeability reduction for the overall length of the slim tube is 94%.
3. Significant increases in the rate of change of pressure differentials occurred during the duration of the run.

In the "Slim Tube" experiment product samples were taken at specified times and locations along the packed core during the course of the experiment. The 40 ft. Berea-packed column had both transducers and sampling ports at the inlet and each subsequent 10 ft. interval.

These results show that overall permeability reduction continues to increase due to the increase of in situ produced biopolymer throughout the length of the 40 ft. slim tube. By continually monitoring pressure response and the concentration of biopolymer at the sample ports, a good representation of experimental progress (for permeability reduction) was continually available.

This experiment also demonstrated that the Salton bacteria cells will transport through high permeability Berea core at a reasonable concentration for process effectiveness.

CELL AND SPORE PENETRATION EXPERIMENTS

EXAMPLE 3 (Cell Injection Phase)

A cell penetration experiment using a moderately permeable Berea sandstone core (146 md, 9 cm in length) and a highly permeable core (1361 md, 9 cm long) was conducted to measure the flow properties of the cell suspension. Three pore volumes of $4 \times 10^5$ cells/ml were added to each core. High retention of the cells on the sandstone with each core resulted; i.e., essentially 100% of the cells injected were retained on the respective cores.

A second cell migration experiment was run using a 9 cm long×5 cm diameter Berea core to obtain more information on Salton cell penetration. Again, the majortiy of the cells were retained within the core. The following material balanced was calculated:

Total Liquid recovery=99.4%
Total vegative cell count feed=$1.06 \times 10^8$ cells/ml
Total recovered cell count=$3.06 \times 10^5$ cells/ml This showed that greater than 99% of the feed cells were retained on the core. From these two tests it became apparent that spores, not cells, should be the penetrating/migrating species through the sandstone. The cells appear either too large and/or adhesive to the core material and cannot travel through the network of rock pores for any appreciable distance.

EXAMPLE 4 (Spore Pretreatment)

When cells of Bacillus bacteria are induced to sporulate, microscopic observation of fresh spores reveals small, optically refractile spores plus considerable adhering cell debris. When such "fresh" spores were diluted to approximately $10^6$ spores/ml and injected into a Berea core of 1000 md permeability, poor injectability was obtained with almost immediate face plugging. Visual observation revealed a film of sticky proteinaceous matter on the face of the core. The concentrated spore suspension was then treated by adding 1 mg/ml lysozyme at 40° C. for 2 hours. The spores were then filtered through Whatman No. 1 paper. Microscopic observation revealed that the previous adherent material was no longer present. Subsequent injection of these treated spores into a core gave good injectability with no buildup of any faceplugging layer.

It was later observed that aging of a fresh spore suspension for a period in excess of two months has a beneficial effect similar to that which can be obtained with lysozyme in a few hours.

EXAMPLE 5 (Spore Injection)

Spore transport and spore adsorption/desorption characteristics were studied in a high and a low permeability core. A $10^7$/ml concentration of pretreated spores was injected into each core for 23.33 hours. The low permeability core received 18.1 pore volumes (PV) of spores followed by the same amount of brine; the high permeability core received 8.5 PV spores followed by the same amount of brine.

TABLE 1

| Low Permeability Core | | High Permeability Core |
|---|---|---|
| 9.2 cm | Length | 16.3 cm |
| 5.1 cm | Diameter | 5.0 cm |
| 35.0 ml | Pore Volume | 74.4 ml |
| | PERMEABILITY (feed rate - 5.2 ft/d (field)) | |
| 123 md | Brine | 800 md |
| 105 md | 50% Spores Added | 800 md |
| 82 md | 100% Spores Added | 686 md |

The pressure drop data for the high permeability core indicate that the spores penetrated farther than in the low permeability core. After completing the material balance for the high permeability core, the following conclusions have been made:

1. Breakthrough of injected spores in the core effluent occurred at 0.5 PV which is a measure of the "inaccessible pore volume" for spore transport.

2. Over the course of the experiment, spore concentration in the effluent increased from $4 \times 10^2$ to $1.8 \times 10^6$ spores/ml.

3. 95% of the injected spores were retained by the high permeability core even after extensive brine flushing. A negligible concentration of spores was detected in the effluent during the injection and subsequent brine flushing from the low permeability core.

Significant overall permeability reduction was observed in both cores but the pressure drop data suggest some spore accumulation at the front of each core.

EXAMPLE 6 (Spore Injection)

In proposed field application, large volumes of fluids will pass through the well bore surface where any face plugging mechanism is a concern. A Salton spore suspension (conc.=$1.3 \times 10^6$ spores/ml) was injected into a small cross section, low permeability (141 md) Berea core at a rate of 1 PV/hr in two operational modes; i.e., continuous recycle and straight-through single pass.

TABLE 2

| | PERMEABILITIES (recycle) | |
|---|---|---|
| 1. | Brine | 141 md |
| 2. | After 138 pv Spores Added | 140 md |
| 3. | After 337 pv Spores Added | 132 md |
| | PERMEABILITIES (single pass) | |
| 1. | After 91 pv Spores Added (428 pv cum.) | 124 md |
| 2. | After 151 pv Spores Added (488 pv cum.) | 115 md |
| 3. | After 184 pv Spores Added (521 pv cum.) | 110 md |

Core Parameters:
L = 8.5 cm
D = 1.4 cm
PV = 6.5 ml

The results of Table 2 show the permeability calculations for the single pass and recycle experiments. Further it was observed that no feed spores were detected in the effluent sent back to recycle. It can thus be safely assumed that for the 365 hours of recycling 337 PV of spores, essentially 100% of the spores remained on the core. Also, by carefully reviewing the pressure drop data along the length of the core, the predominant weight fraction of the feed was in the very front (face) of the core. This almost certainly accounts for the 6% permeability reduction after 337 PV were recycled.

The same core was then used for straightthrough, single pass operation and was continuously injected with 184 PV of a $1.35 \times 10^6$/ml spore feed. Again, no spores were detected in the effluent. After 184 PV were added in the single-pass mode and 337 PV in the recycle mode (521 total PV added) a 22% permeability reduction was measured. After feeding over 500 PV of the spore suspension, no indication of any face plugging was evident, i.e., only a +0.3 psig pressure change at the face of the core.

EXAMPLE 7 (Spore Retention)

Spores were injected in a single pass to a Berea core of relatively high starting brine permeability (approximately 2100 md). The essential core parameters are listed below:

Core length=10.85 cm

Diameter = 5.04 cm
Pore volume = 49.7 ml

Only two pressure transducers, inlet and outlet, were attached to the core; 145 PV of spores were injected (average conc. = $1.9 \times 10/^6$ ml) into the core over 339 hours at an average feed rate of 0.36 ml/min. The results show that spore breakthrough ($2.5 \times 10^2$ spores/ml) occurred after 20.7 ml (0.42 PV) and the concentration of spores continued to increase during pumping to an effluent concentration of $5.6 \times 10^5$ spores/ml at the conclusion of the experiment. An accurate material balance was completed for this run as follows:

Total spores fed (145 PV) = $1.43 \times 10^{10}$
Total spores recovered (effluent) = $5.73 \times 10^8$
Spores recovered = 4%
Spores remaining on core = 96%

This result indicates that the majority of the spores are retained by the core after feeding 145 PV. Permeability has continued to decrease throughout the duration of the run from approximately 2100 md at the beginning to 60 md at the end of the experiment. No plugging was observed at the core face; injection rate decreased only 13%; and the injection pressure increased less than 1 psig.

It has been experimentally shown that under conditions of our invention, cells and spores can easily penetrate Berea core material. These conditions are:

(1) Use of selected bacteria such as our SLS and SALTON-1 strains which form small, compact spores and motile cells.

(2) Pretreatment of spores with a proteolytic enzyme such as lysozyme (or with autogenous proteases generated by long-term aging of spores) so as to remove adhering cell debris and sticky proteins.

(3) Use of polyphosphate ion in the nutrient solution which chelates and prevents precipitation with ions present in the connate brine such as calcium and magnesium.

In the Examples, cells and viscous biopolymer were evident the total length of the core. Since the experiment used a high permeability core, it is safe to say that field "thief zones" can be altered successfully by this microbial profile modification process. In no experiments where our preferred precedures have been used has there been any significant face plugging. Cells and spores have easily gone into the respective cores of low or high permeability. If continuous flow measurements are taken in low permeability cores using cells or spores, little or no penetration is observed by pressure drop data, but no face plugging is evident after many pore volumes of nutrient or recycle solution has been added. In contrast to this, continuous injection experiments of spores into high permeability cores, develop a gradient of spore concentration (by observing pressure drop data) with some fraction (e.g., 5%) of feed spores collected at the effluent after a suitable period.

Our proposed MEOR process will give the germinated cells time to grow, multiply, and produce biopolymer. This "incubation" time is, if all components have been properly selected, less than a week in duration. We have observed substantial incubation gas production over the total length of core, cell growth followed by biopolymer production and lasting permeability reduction to continual brine flushing.

The magnitude of profile modification with our process can easily be as low as 65% permeability reduction and as high as 95%. The level of reduction depends on several factors; i.e., beginning permeability, amount of bacteria added, incubation time, and obviously, proper nutrient. The ease of reducing permeability seems to increase when using cores that are in excess of 600 md, which is desirable since the "thief zones" we wish to plug are high permeability. Also, a certain level (concentration) of cells may be necessary before substantial amounts of biopolymer are formed and permeability is reduced.

The first amount of injected cells may act as a "conditioner" for the sandstone, enabling further spore/cell addition to perform their required tasks, i.e., germination, reproduction, and biopolymer production. Incubation times of 5-10 days allows processing steps to be completed. Nutrient composition and the quantity added are "critical" process requirements. All nutrient formulations must be optimized to maximize biopolymer production. Also, when more than one addition of nutrient is made, more than one cell/spore addition may be required to adhieve maximum permeability reduction. Alternatively profile modification can be accomplished by injecting the nutrient solution into an injection well and the spores or cells or mixtures thereof into an adjacent production well, or vice versa. If all steps have been achieved to ensure significant profile modification, permeability reduction will be more resistant to erosion due to continual water flooding and elapsed time.

Sine many modifications and variations of the present invention are possible within the spirit of this disclosure, it is intended that the embodiments that are disclosed are only illustrative and not restrictive. Reference is made to the following claims rather than the specific description to indicate the scope of the invention.

What is claimed is:

1. A process for enhancing oil recovery by improving the sweep efficiency of a water flood through an oil producing reservoir which has zones of relatively high permeability and saline connate water, comprising the steps of:
   isolating a bacterium that has the following characteristics:
     it is motile;
     it is a facultative anaerobe;
     it is at least halotolerant;
     it is at least thermotolerant;
     it produces an exopolymer; and
     it sporulates;
   preparing a suspension of said bacterial spores or cells or mixtures thereof;
   injecting said suspension into an oil producing reservoir where said spores or cells may become lodged in zones of relatively high permeability; and
   contacting said spores or cells with a nutrient solution to induce them to plug said zones of relatively high permeability, said nutrient solution comprises a source of phosphate nutrient as polyphosphate.

2. The method of claim 1 further comprising:
   flowing water downhole into said oil producing reservoir prior to injecting said bacterial spores or cells.

3. The method of claim 1 further comprising:
   flowing water into said oil producing reservoir after said nutrient solution.

4. The method of claim 1 further comprising:
   flowing a flooding agent into said zones of high permeability after said spores and cells have plugged said zones so that said flooding agent may push out any oil that is in said reservoir.

5. The method of claim 1 wherein said nutrient solution is injected prior to the injection of said bacterial spores or cells or mixtures thereof.

6. The method of claim 1 wherein said nutrient solution is injected simultaneously with said bacterial spores or cells or mixtures thereof.

7. The method of claim 1 wherein said nutrient solution is injected after said bacterial spores or cells or mixtures thereof.

8. The method of claim 1 where said nutrient solution is injected into a production well and said bacterial spores or cells or mixtures thereof are injected into an adjacent injection well.

9. The method of claim 1 where said nutrient solution is injected into an injection well and said bacterial spores or cells or mixtures thereof are injected into an adjacent production well.

10. An enhanced oil recovery process comprising selectively plugging relatively high permeable zones within a petroleum reservoir using a biologically pure strain of *Bacillus licheniformis*, NRRL No. B-18179 or its spores or mixtures thereof.

11. An enhanced oil recovery process comprising selectively plugging relatively highly permeable zones within a petroleum reservoir using a biologically pure strain of *Bacillus licheniformis*, NRRL No. B-18178 or its spores or mixtures thereof.

12. An enhanced oil recovery process comprising selectively plugging relatively highly permeable zones within a petroleum reservoir using a biologically pure strain of *Bacillus licheniformis*, NRRL Nos. B-18178 and 18179 or their spores or mixtures thereof.

13. The process of claims 10, 11, or 12 wherein the spores have been pretreated with proteolytic enzymes.

14. The process according to claims 10, 11 or 12 wherein the spores have been aged in suspension for a period of at least one month.

15. The process according to claims 10, 11 or 12 wherein the relatively highly permeable zones are selectively plugged by the growth of the bacteria and by the production of a bacterial exopolymer.

16. The process according to claims 10, 11 or 12 further comprising injecting a nutrient solution into the relatively highly permeable zones.

17. A process according to claim 16 further comprising injecting a nutrient solution into the relatively highly permeable zones comprising polyphosphate and a polyvalent crosslinker.

18. A process as recited in claim 17 wherein the polyvalent crosslinker is an ion selected from the group consisting of aluminum, titanium, or chromium.

19. A process as recited in claim 18 further comprising flowing water into the relatively highly permeable zones before the introduction of the bacterial spores or cells.

20. A process as recited in claim 18 further comprising flowing water into the relatively highly permeable zones after the introduction of the nutrient medium.

21. A process as recited in claim 18 further comprising flowing a flooding agent into the petroleum reservoir after the relatively highly permeable zones have been plugged.

22. A process as recited in claim 18 wherein the nutrient solution is flowed into the relatively highly permeable zones prior to the introduction of the bacterial cells or spores.

23. A process as recited in claim 18 wherein the nutrient solution is flowed into the relatively highly permeable zones simultaneously with the introduction of the the bacterial cells or spores.

24. A process as recited in claim 18 wherein the nutrient solution is flowed into the relatively highly permeable zones after the introduction of the bacterial cells or spores.

25. A process as recited in claim 24 further comprising flowing the nutrient solution into a production well and the bacterial spores or cells or mixtures thereof are injected into an adjacent injection well.

26. A process as recited in claim 24 wherein the nutrient solution is flowed into an injection well and the bacterial spores or cells or mixtures thereof are injected into an adjacent production well.

27. A process for modifying the profile of a petroleum reservoir to enhance oil recovery from relatively high permeability zones, comprising:
   preparing a biologically pure form of *Bacillus licheniformis*, NRRL No. B-18178 or B-18179;
   forming spores of B-18178 or B-18179;
   separating the spores from cell debris and proteins;
   flowing the spores into a relatively high permeability zone in a petroleum reservoir; and
   contacting the spores with a nutrient solution to facilitate growth and exopolymer production.

28. The method of claim 1 wherein the polyphosphate is also used as a chelating agent.

* * * * *